United States Patent
Padhan et al.

(10) Patent No.: US 9,981,545 B1
(45) Date of Patent: May 29, 2018

(54) ZERO TURNING RADIUS MOWER RADIATOR MOUNTING STRUCTURE

(71) Applicant: Deere & Company, Moline, IL (US)

(72) Inventors: Umakanta Padhan, Pune (IN); Michael T. Schmidt, Holly Springs, NC (US); Jennifer L. Jaramillo, Apex, NC (US); Curtis D. Ayers, Willow Springs, NC (US); Michael J. Austin, Fuquay Varina, NC (US)

(73) Assignee: Deere & Company, Moline, IL (US)

( * ) Notice: Subject to any disclaimer, the term of this patent is extended or adjusted under 35 U.S.C. 154(b) by 0 days. days.

(21) Appl. No.: 15/472,952

(22) Filed: Mar. 29, 2017

(51) Int. Cl.
*B60K 11/04* (2006.01)
*B60R 21/13* (2006.01)

(52) U.S. Cl.
CPC .......... *B60K 11/04* (2013.01); *B60R 21/131* (2013.01); *B60Y 2200/223* (2013.01)

(58) Field of Classification Search
CPC .. B60K 11/04; B60R 21/131; B60Y 2200/223
See application file for complete search history.

(56) References Cited

U.S. PATENT DOCUMENTS

| | | | | |
|---|---|---|---|---|
| 6,105,349 A * | 8/2000 | Busboom | ................. | F01P 11/12 180/68.6 |
| 6,412,581 B2 * | 7/2002 | Enomoto | ............... | B60K 11/04 165/69 |
| 6,578,656 B2 * | 6/2003 | Samejima | .............. | A01D 69/03 180/291 |
| 6,634,448 B2 * | 10/2003 | Bland | ................... | B60K 11/04 123/41.01 |
| 6,675,921 B2 * | 1/2004 | Brown | .................. | B60K 11/04 165/67 |
| 7,255,189 B2 * | 8/2007 | Kurtz, Jr. | ............... | B60K 11/04 123/41.43 |
| 7,320,299 B2 * | 1/2008 | Eavenson, Sr. | ....... | F01N 13/082 123/41.49 |
| 7,458,434 B2 * | 12/2008 | Samejima | .............. | A01D 34/82 180/68.1 |
| 7,506,851 B1 * | 3/2009 | Tooze | ..................... | F24D 19/02 165/67 |
| 7,866,426 B2 * | 1/2011 | Umemoto | .............. | A01D 34/66 180/68.4 |
| 7,971,904 B2 * | 7/2011 | David | ..................... | B60R 21/13 280/756 |
| 8,029,019 B2 * | 10/2011 | Schmidt | ................ | B60R 21/131 280/756 |
| 8,186,751 B2 * | 5/2012 | Davisdon | ................ | B60R 19/52 296/193.1 |
| 8,235,155 B2 * | 8/2012 | Seegert | ..................... | E02F 9/00 165/67 |

(Continued)

FOREIGN PATENT DOCUMENTS

EP 2333166 B1 7/2012

*Primary Examiner* — Jacob B Meyer

(57) ABSTRACT

A zero turning radius mower radiator mounting structure having inclined deflectors extending upwardly from the radiator. The inclined deflectors slide on a cross member extending horizontally across the roll over protection system if the mower is in a rollover position. The inclined deflectors push the radiator rearwardly from the roll over protection system and disengage the radiator from first and second pairs of isolators.

12 Claims, 4 Drawing Sheets

(56) References Cited

U.S. PATENT DOCUMENTS

| | | | | |
|---|---|---|---|---|
| 8,905,434 B1* | 12/2014 | Bartel | ............... | B60R 21/131 |
| | | | | 280/756 |
| 9,327,670 B1* | 5/2016 | Bartel | ............... | B60R 21/131 |
| 9,516,808 B2* | 12/2016 | Takaoka | ............... | A01D 34/66 |
| 9,616,837 B1* | 4/2017 | Bartel | ............... | B60R 21/13 |
| 9,676,270 B2* | 6/2017 | Tsuchihashi | ............... | B60K 11/04 |
| 9,849,854 B2* | 12/2017 | Kanai | ............... | B60R 21/131 |
| 2007/0252371 A1* | 11/2007 | Schlup, Jr. | ............... | B60R 21/131 |
| | | | | 280/756 |
| 2016/0040634 A1* | 2/2016 | Haight | ............... | B01D 46/0083 |
| | | | | 95/26 |
| 2016/0369478 A1* | 12/2016 | Kokuryou | ............... | E02F 3/325 |
| 2017/0087976 A1* | 3/2017 | Tsuchihashi | ............... | B60K 11/04 |

* cited by examiner

ZERO TURNING RADIUS MOWER RADIATOR MOUNTING STRUCTURE

FIELD OF THE INVENTION

This invention relates to zero turning radius ("ZTR") mowers having rear mounted engines and independently powered left and right drive wheels controlled with hydrostatic transmissions, and more specifically to a ZTR mower radiator mounting structure.

BACKGROUND OF THE INVENTION

Zero turning radius ("ZTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine. The independent rear drive wheels allow the ZTR mower to turn on a vertical turning axis. The vertical turning axis may be centrally located between the pair of hydrostatic transmissions.

ZTR mowers may have frames with left and right longitudinal frame members supported on a forward end by front wheels and extending rearwardly to support an internal combustion engine behind the operator seat and rear wheels. A mower deck may be suspended between the front and rear wheels. A seated operator may use left and right control levers or other steering controls to control the pair of hydrostatic transmissions driving the left and right rear drive wheels.

ZTR mowers also may have roll over protection systems, or ROPS, mounted to the vehicle frame behind the operator seat for preventing the vehicle from crushing the operator if the mower accidentally rolls over. U.S. Pat. No. 7,971,904 for Roll over protection system shows steel tubing bent into a desired shape with each of the lower legs including an arced or curved portion between an upper portion and a horizontal or nearly horizontal portion mounted to the vehicle frame. The upper portion of the ROPS may be vertical or inclined forwardly, and may be hinged to each of the lower legs with a pivot bracket so that the upper portion may be folded down and lowered.

Some ZTR mowers have water cooled engines with radiators mounted at various locations behind the operator seat. For example, U.S. Pat. No. 7,866,426 for Radiator support structure shows a radiator mounted behind the operator seat, under and between the pair of lower legs or support columns of the ROPS. Mounting the radiator under the ROPS allows the space to be utilized efficiently. However, if the ZTR mower rolls over or on its side, there is a risk that the ROPS may penetrate, crush or puncture the radiator, which might result in hot fluids leaking from the radiator near the operator. A ZTR mower radiator mounting structure is needed that reduces the risk that a ROPS might penetrate, crush or puncture the radiator if the mower is in a roll over position.

SUMMARY OF THE INVENTION

A zero turning radius mower radiator mounting structure includes a roll over protection system having a cross member, and a radiator having at least one inclined deflector at an upper corner of the radiator below the cross member. The inclined deflector has sliding contact with the cross member to push the radiator rearwardly if the mower is in a roll over position. A first pair of isolators between the roll over protection system and the radiator are deformable to disengage the radiator if the inclined deflector pushes the radiator rearwardly.

DESCRIPTION OF THE PREFERRED EMBODIMENT

Figure 1:
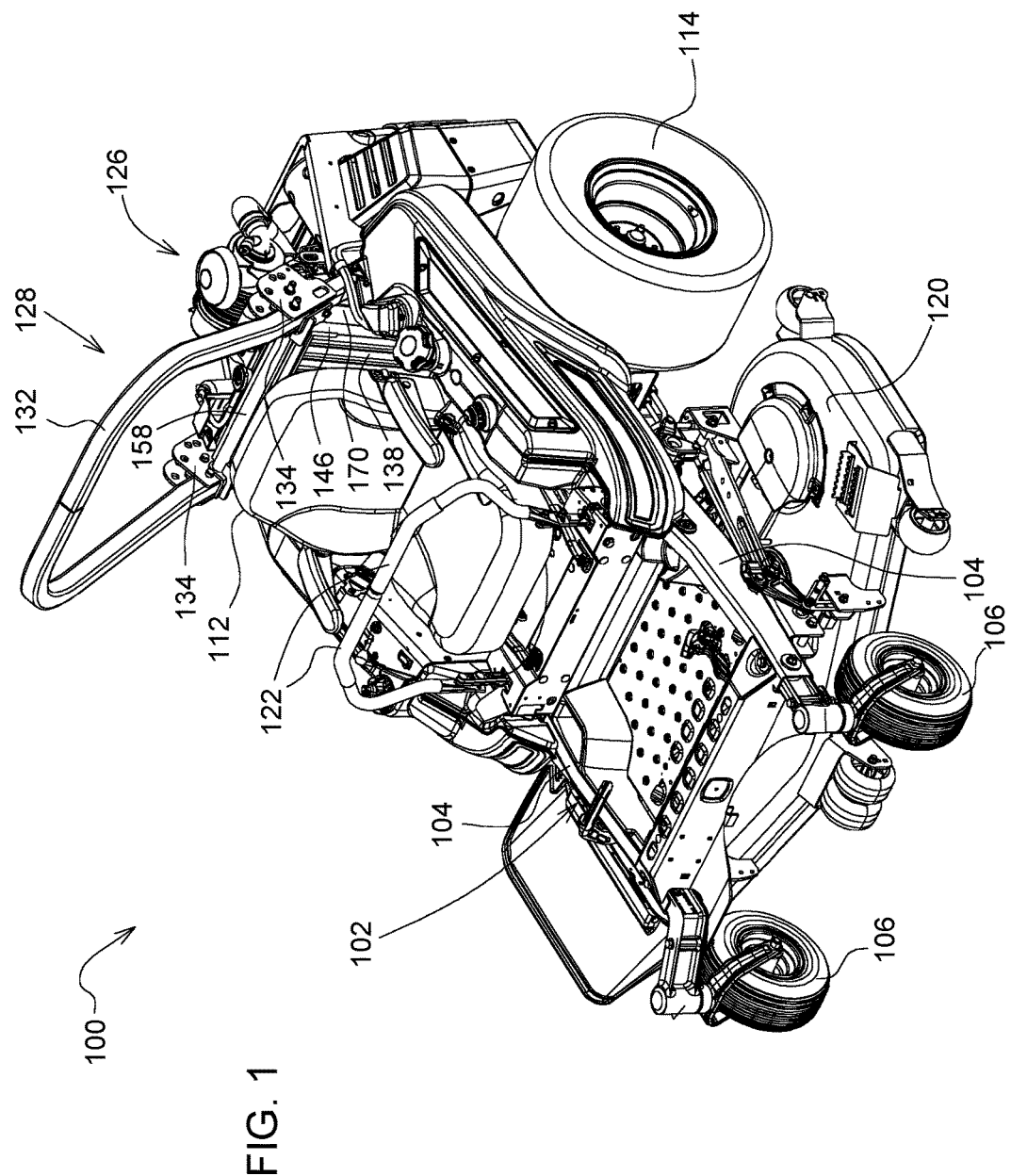
FIG. 1 is a top perspective view of a ZTR mower with a radiator mounting structure according to a first embodiment of the invention.
Figure 2:
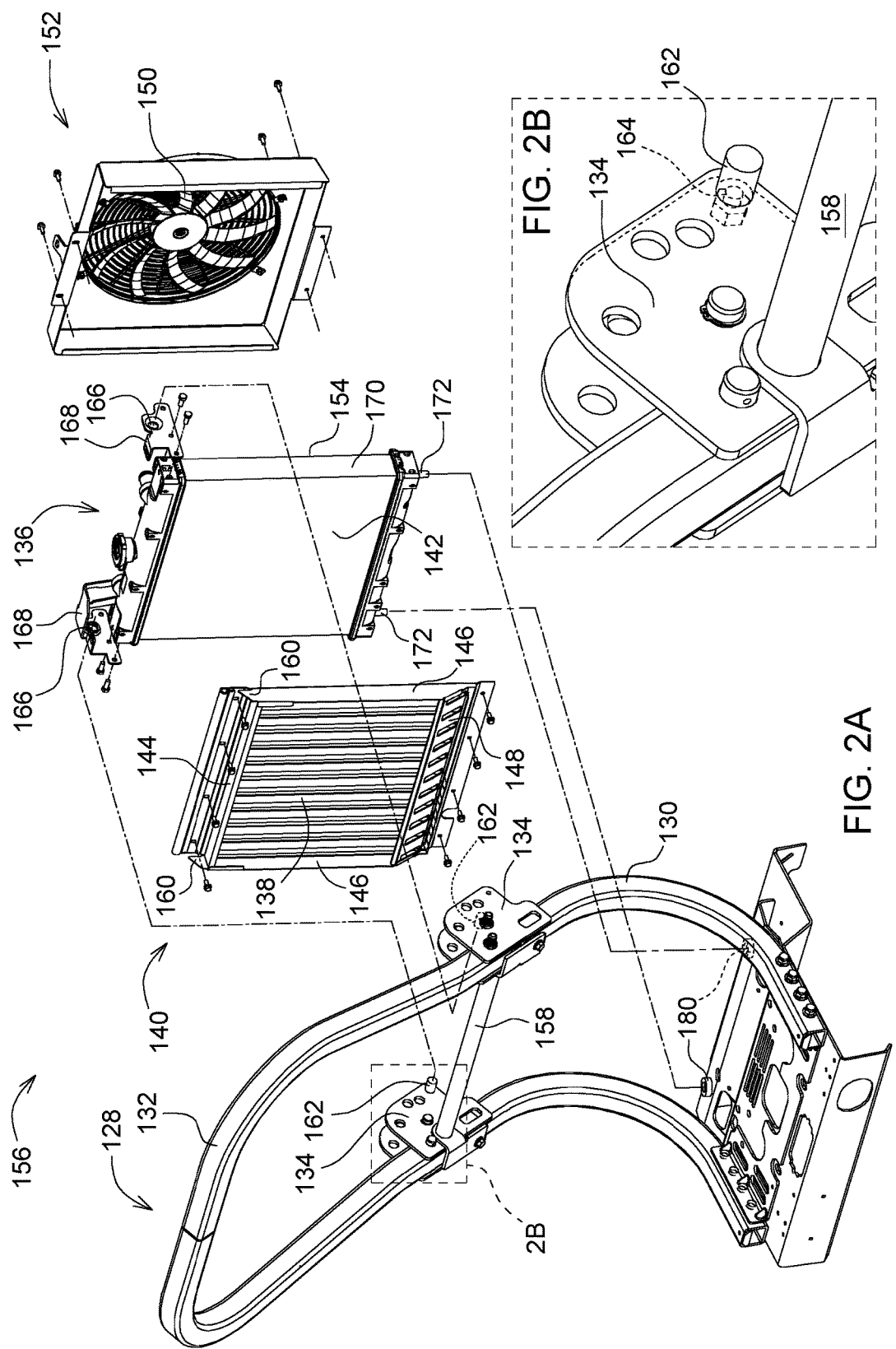
FIG. 2A is an exploded perspective view of a ZTR mower radiator mounting structure according to a first embodiment of the invention.
FIG. 2B is an enlarged perspective view of the horizontal isolators and pivot bracket of the ZTR mower radiator mounting structure according to a first embodiment of the invention.
Figure 3:
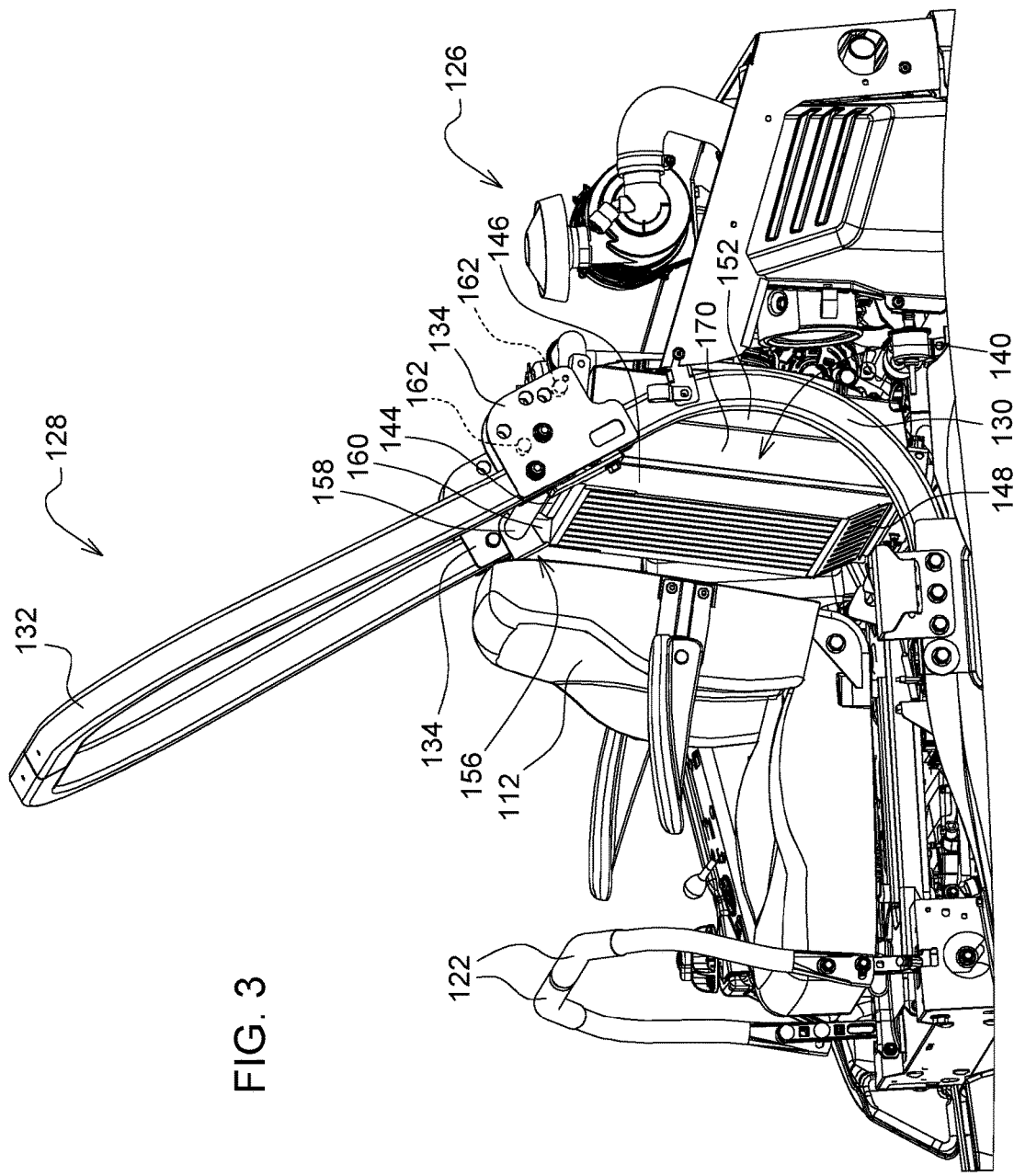
FIG. 3 is a front perspective view of a ZTR mower radiator mounting structure in an operating position according to a first embodiment of the invention.

In the embodiment shown in FIGS. 1-4, zero turning radius ("ZTR") mower 100 may include vehicle frame 102 with left and right longitudinal frame members 104 supported on a forward end by front wheels 106 and extending rearwardly past operator seat 112 and rear drive wheels 114. Mower deck 120 may be suspended from the frame between the front and rear wheels. A seated operator may use control levers 122 or other steering controls, to control a pair of hydrostatic transmissions driving the left and right rear drive wheels. Water cooled internal combustion engine 126 may be mounted to the frame behind and rearwardly of operator seat 112 and rear drive wheels 114. The engine may be mounted transversely or longitudinally onto the frame.

In one embodiment, ZTR mower 100 may include roll over protection system 128, or ROPS, mounted to the vehicle frame behind and/or adjacent operator seat 112. ROPS 128 may have one of several different configurations. For example, the ROPS may include a pair of lower legs or support columns 130 secured to the vehicle frame directly or with mounting brackets. The lower legs or support columns may be vertically aligned, or may be curved with a horizontal or nearly horizontal portion connected to the frame. The upper portion 132 of the ROPS may be an inverted U-shape. Optionally, the upper portion of the ROPS may be hinged to each of the lower legs with pivot brackets 134, so that the upper portion may be folded down and lowered.

In one embodiment, ZTR mower 100 may have radiator 136 mounted under ROPS 128, generally between the pair of lower legs or support columns 130. In the operating position where the ZTR mower is upright and supported by its wheels, the radiator may be oriented generally vertically, or inclined such that at least a portion of the radiator may be positioned between the pair of lower legs or support columns. Screen 138 may be enclosed in frame 140 that may be attached to and cover front face 142 of radiator 136. Frame 140 may include top frame member 144, side frame members 146, and bottom frame member 148. Fan 150 may be enclosed in box-shaped fan shroud 152 that may be attached to and positioned over rear face 154 of radiator 136.

In one embodiment, ZTR mower radiator mounting structure 156 may include cross member 158 which may be a metal bar having a round or circular cross section, although other materials or cross sections may be used. Cross member 158 may be welded or fastened horizontally across ROPS 128. For example, cross member 158 may extend between the pair of pivot brackets 134, or between the pair of lower legs or support columns 130 of the ROPS. Cross member 158 preferably may remain in place if upper portion 132 of the ROPS is folded down and lowered. In the operating position, cross member 158 may be positioned above and/or slightly forwardly of radiator 136, and may help resist bending of the lower legs or support columns of the ROPS against the radiator.

In one embodiment, ZTR mower radiator mounting structure 156 may include at least one, and preferably at least two inclined deflectors 160 at or near the upper corners of the radiator. Each inclined deflector 160 may be a plate having a top surface that slopes upwardly at an angle of between about 30 degrees and about 60 degrees from the front towards the rear. Each inclined deflector 160 may be attached directly or indirectly to radiator 136. For example, each inclined deflector 160 may be at the upper end of a side frame member 146 of screen frame 140 attached to front face 142 of radiator 136. Each inclined deflector may have a generally triangular shape, and may be a metal plate or any other material having a top surface configured to slides rearwardly when contacting cross member 158. In the operating position where the ZTR mower is upright and supported by its wheels, each inclined deflector is preferably less than about 1 inch directly below cross member 158. In a roll over position, where the ZTR mower has rolled over or on its side, one or both inclined deflectors 160 come into sliding contact with cross member 158, and push the radiator rearwardly behind the lower legs or support columns of the ROPS.

In one embodiment, ZTR mower radiator mounting structure 156 may include first pair of isolators 162. The first pair of isolators preferably are horizontal isolators, each having a rubber body and a first end attached to the ROPS. For example, the first end may be bonded to threaded fastener 164 which may be inserted through a hole in pivot bracket 134 and secured with a nut. In the operating position, the second end of each horizontal isolator 162 may releasably engage a side 170 of radiator 136, or engage a bracket 168 attached to the side of the radiator. For example, in the operating position, the second end may be inserted through tapered hole 166 in radiator mounting bracket 168 attached to the side of radiator 136. Each of the first or horizontal isolators may be sufficiently flexible and deformable so that the second end disengages the side of radiator 136 and/or mounting bracket 168 in the roll over position as the inclined deflectors push the radiator rearwardly.

In one embodiment, ZTR mower radiator mounting structure 156 may include second pair of isolators 180. The second pair of isolators may be vertical isolators, each having a ring-shaped rubber body attached or positioned in frame 102 behind the operator seat. When the mower is in the operating position, the bottom surface of radiator 136 may rest on the second pair of isolators. For example, the bottom surface of the radiator may include a pair of pins 172 that may extend into and rest in the pair of vertical isolators. In the roll over position, the bottom surface of the radiator may disengage the vertical isolators as the inclined deflectors push the radiator rearwardly.

Figure 4:
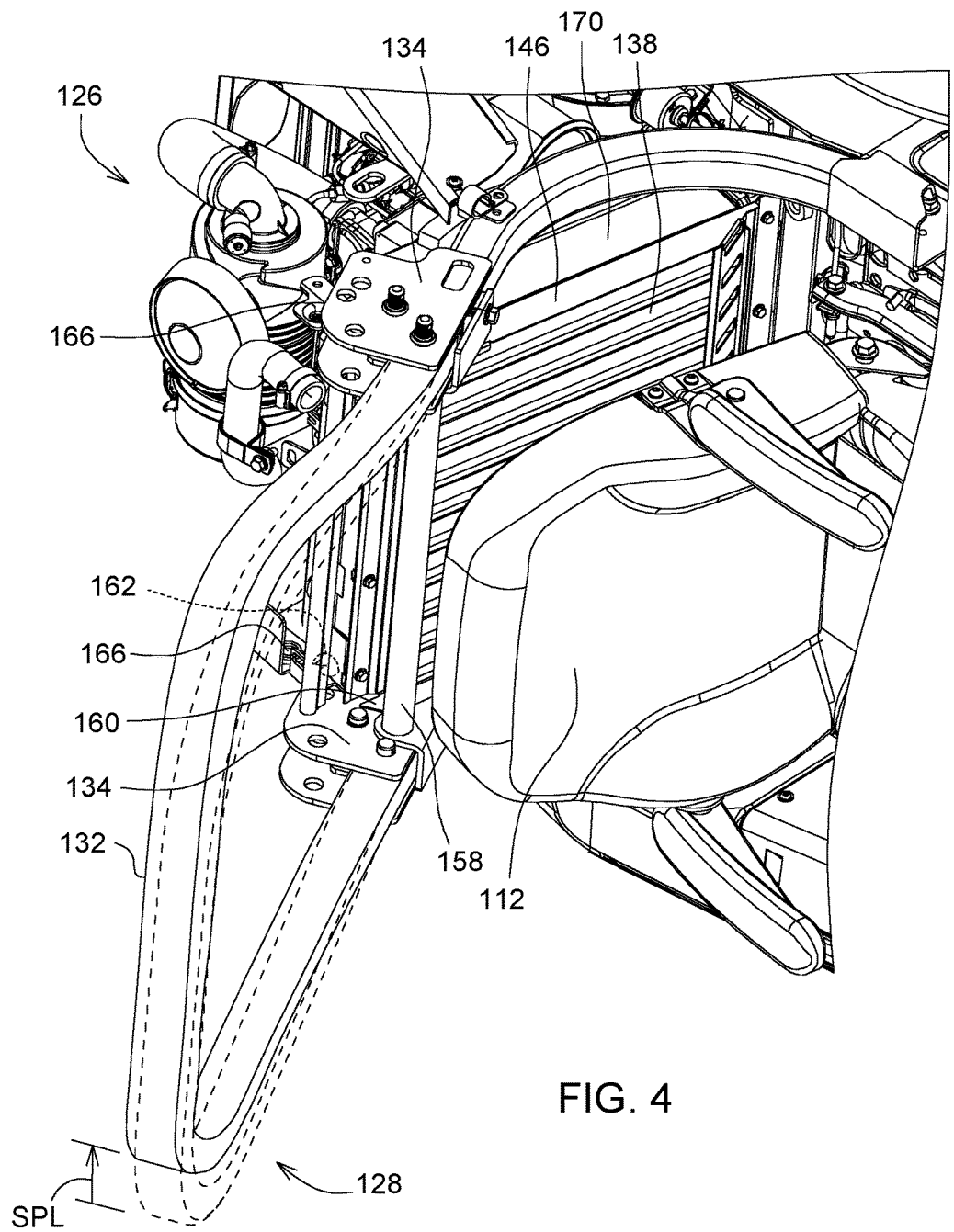
FIG. 4 is a side perspective view of a ZTR mower radiator mounting structure in a roll over position according to a first embodiment of the invention.

In the roll over position shown in FIG. 4, ROPS 128 is subject to side push loading. Side push loading (SPL) may bend the ROPS. Cross member 158 may help resist bending of the lower legs or support columns of the ROPS against the radiator. One or both inclined deflectors 160 contact cross member 158 and push the radiator rearwardly behind the ROPS. As a result, the first pair of horizontal isolators 162 may flex and deform sufficiently to disengage the radiator. The radiator also may become disengaged from the second pair of vertical isolators 180. The radiator mounting structure, including the inclined deflectors 160, cross member 158, horizontal isolators 162 and vertical isolators 180, help prevent the ROPS from penetrating, crushing or puncturing the radiator.

Having described the preferred embodiment, it will become apparent that various modifications can be made without departing from the scope of the invention as defined in the accompanying claims.

The invention claimed is:

1. A zero turning radius mower radiator mounting structure, comprising:
 a roll over protection system including a cross member;
 a radiator having at least one inclined deflector at an upper corner of the radiator below the cross member; the inclined deflector having sliding contact with the cross member to push the radiator rearwardly in a roll over position; and
 a first pair of isolators between the roll over protection system and the radiator and being deformable and configured to disengage the radiator if the inclined deflector pushes the radiator rearwardly.

2. The zero turning radius mower radiator mounting structure of claim 1 further comprising a pair of pivot brackets attached to the roll over protection system between a pair of lower legs and an upper portion that can be folded down; the cross member extending between the pair of pivot brackets.

3. The zero turning radius mower radiator mounting structure of claim 2 wherein the first pair of isolators are connected to the pivot brackets.

4. The zero turning radius mower radiator mounting structure of claim 1 further comprising a pair of radiator mounting brackets mounted to the radiator; each of the first pair of isolators engaging an opening in one of the radiator mounting brackets.

5. The zero turning radius mower radiator mounting structure of claim 1 further comprising a screen in a frame attached to a front of the radiator, the inclined deflector being at an upper end of a side member of the frame.

6. A zero turning radius mower radiator mounting structure, comprising:
 a roll over protection system including a pair of lower legs, a foldable upper portion, and a cross member below the upper portion;
 a radiator positioned under the roll over protection system between the pair of lower legs;
 a first pair of isolators extending between the radiator and the roll over protection system, and a second pair of isolators under the radiator; and
 a screen in a frame attached to the radiator and having a pair of inclined deflectors extending upwardly from the frame and configured to slide on the cross member to push the radiator rearwardly in a roll over position.

7. The zero turning radius mower radiator mounting structure of claim 6, wherein the first pair of isolators are deformable to disengage the radiator in the roll over position.

8. The zero turning radius mower radiator mounting structure of claim 6 wherein the pair of inclined deflectors are spaced from the cross member in an operating position.

9. The zero turning radius mower radiator mounting structure of claim 6 wherein the radiator is behind an operator seat and in front of an internal combustion engine.

10. A zero turning radius mower radiator mounting structure, comprising:
   a radiator mounted with a first pair of horizontal isolators to a roll over protection system on a mower and with a second pair of isolators to a frame of the mower; and
   at least two inclined deflectors extending upwardly from the radiator configured to push the radiator rearwardly and disengage the radiator from the first and second pairs of isolators if the mower is in a rollover position.

11. The zero turning radius mower radiator mounting structure of claim 10 further comprising a cross member extending horizontally across the roll over protection system; the inclined deflectors sliding on the cross member to push the radiator rearwardly.

12. The zero turning radius mower radiator mounting structure of claim 11 wherein the inclined deflectors are spaced from the cross member in an operating position.

* * * * *